(12) United States Patent
Lier

(10) Patent No.: US 8,357,872 B2
(45) Date of Patent: Jan. 22, 2013

(54) PIPE-PROCESSING, IN PARTICULAR A PIPE-CUTTING APPARATUS

(75) Inventor: Andreas Lier, Hilzingen (DE)

(73) Assignee: Illinois Tool Works Inc., Glenview, IL (US)

( * ) Notice: Subject to any disclaimer, the term of this patent is extended or adjusted under 35 U.S.C. 154(b) by 139 days.

(21) Appl. No.: 12/993,200

(22) PCT Filed: May 14, 2009

(86) PCT No.: PCT/US2009/043894
§ 371 (c)(1),
(2), (4) Date: Nov. 17, 2010

(87) PCT Pub. No.: WO2009/148786
PCT Pub. Date: Dec. 10, 2009

(65) Prior Publication Data
US 2011/0062126 A1    Mar. 17, 2011

(30) Foreign Application Priority Data
May 29, 2008    (DE) .................... 10 2008 025 716

(51) Int. Cl.
*B23K 10/00*    (2006.01)
(52) U.S. Cl. ......... 219/121.39; 219/121.58; 219/121.48; 219/60 R; 219/59.1; 219/61.3
(58) Field of Classification Search ............. 219/121.36, 219/121.39, 121.44, 121.45, 121.46, 121.48, 219/121.58, 60 R, 59.1, 61.3, 69.1; 82/83, 82/84
See application file for complete search history.

(56) References Cited

U.S. PATENT DOCUMENTS

| | | | |
|---|---|---|---|
| 2,842,238 A * | 7/1958 | Shaw et al. | 409/179 |
| 3,678,239 A | 7/1972 | Hill | |
| 3,820,424 A * | 6/1974 | George, Jr. | 82/101 |
| 4,140,890 A | 2/1979 | Daspit | |
| 4,260,869 A * | 4/1981 | Slavens et al. | 219/124.31 |
| 4,625,464 A * | 12/1986 | Kubo | 451/441 |
| 5,081,768 A | 1/1992 | Brennan et al. | |
| 5,349,751 A | 9/1994 | Fahr | |
| 7,257,895 B2 * | 8/2007 | Makkonen et al. | 30/96 |
| 8,061,249 B1 * | 11/2011 | Kaehr et al. | 83/456 |

FOREIGN PATENT DOCUMENTS

| | | |
|---|---|---|
| DE | 1942711 A1 | 2/1971 |
| DE | 102006033992 A1 | 8/2007 |
| DE | 202007015155 U1 | 1/2008 |
| EP | 1301311 B1 | 9/2005 |
| GB | 1359098 A | 7/1974 |
| WO | 02/02271 A1 | 1/2002 |

OTHER PUBLICATIONS

ISR for PCT/US2009/043894 mailed Jan. 26, 2010.
German Search Report for GB 10 2008 025 716.8 dated Jan. 9, 2009.

* cited by examiner

*Primary Examiner* — Mark Paschall
(74) *Attorney, Agent, or Firm* — Lowe Hauptman Ham & Berner LLP

(57) ABSTRACT

A pipe processing apparatus containing a gripping mechanism with bracing rollers, further a drive wheel which is rotationally supported on the pipe processing apparatus and axially parallel to the bracing rollers and is positioned/positionable by its tread at such a site where said tread can make contact with the pipe held by the bracing rollers and can rotate said pipe by static friction; and a drive system to actuate the drive wheel.

17 Claims, 6 Drawing Sheets

PIPE-PROCESSING, IN PARTICULAR A PIPE-CUTTING APPARATUS

RELATED APPLICATIONS

Figure 1:
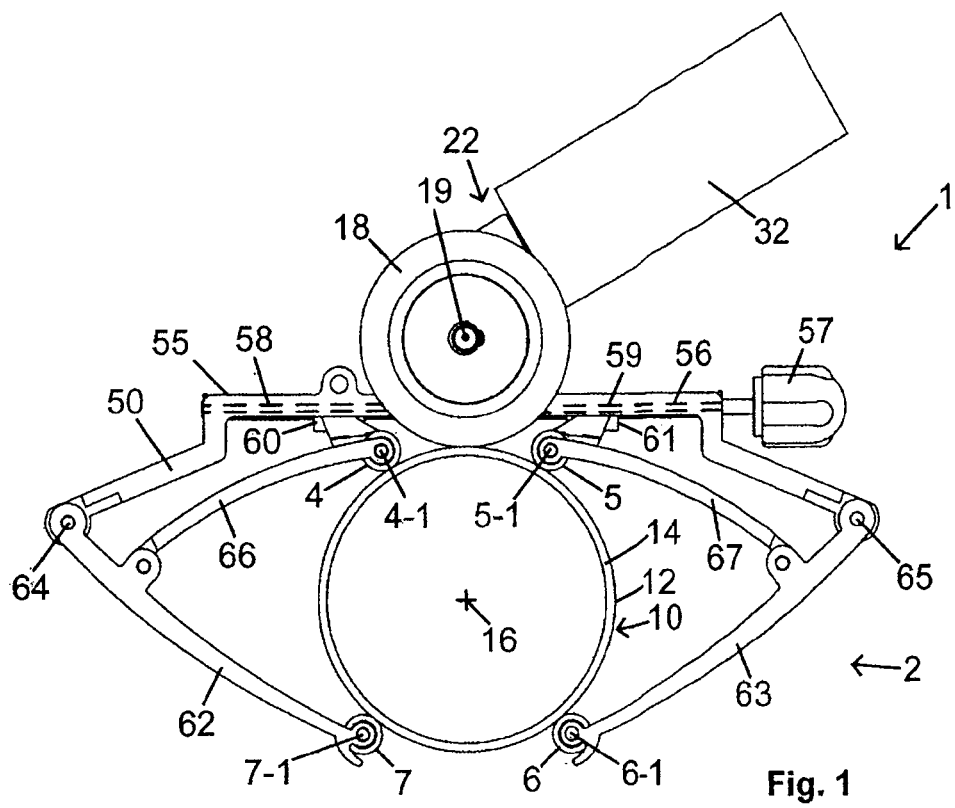

The present application is national phase of International Application Number PCT/US2009/043894 filed May 14, 2009, and claims priority from, German Application Number 102008025716.8 filed May 29, 2008.

The present invention relates to a pipe processing, in particular a pipe cutting apparatus defined in the preamble of claim 1.

Accordingly the present invention relates to pipe processing apparatus containing a gripper mechanism fitted with bracing rollers positioned/positionable in distributed manner over a circle corresponding to the outer diameter of a pipe to be/being processed, the axes of rotation of said braces running parallel to each other and to the longitudinal pipe axis, whereby the gripper mechanism can grip the pipe by means of its bracing rollers and is able to radially center said pipe, whereupon the circumferentially gripped and centered pipe is rotatable inside the gripping mechanism on said rollers and around the pipe longitudinal axis, or the pipe processing apparatus is rotatable about the centered and circumferentially gripped pipe.

Pipe processing apparatus of this kind illustratively is known from the patent documents WO 02/02271 A1 (=EP 1 301 311 B1), DE 20 2007 015 155 U1, U.S. Pat. Nos. 4,625,464; 5,349,751 and 5,081,768.

Such pipe processing apparatus typically is a manually portable and operable hand tool. The pipe processing apparatus usually can be rotated manually about the pipe or the pipe may be manually rotated within the pipe processing apparatus while being in the grip of said gripping mechanism.

The objective of the present invention is to offer a simple way to facilitate handling the pipe processing apparatus.

This problem is solved in the present invention by the features of claim 1.

Further features of this invention are defined in the dependent claims.

The pipe processing apparatus of the present invention preferably shall be both manually portable and manually operable.

The present invention makes it substantially easier for the operator to handle said apparatus of the invention when processing pipes. As a result the processing accuracy also can be improved.

The present invention is suitable both to thermally and mechanically processing pipes, in particular to cutting them, though also to joining pipes and processing pipe ends, using a thermal or mechanical processing element or tool affixed to said apparatus.

The use of such processing elements or tools, in particular of one or more laser or plasma instruments or gas burners, to processing pipes, in particular to cutting them, is not restricted to the pipe processing apparatus which is the object of the present invention, but it may be advantageously combined with it because the pipe processing apparatus of the present invention is rotated more uniformly by the minimum of one drive wheel about a pipe to be/being processed respectively the pipe being rotatable relative to the processing element/tool.

The present invention is elucidated below in relation to the appended drawings and by means of illustrative embodiment modes.

Figure 4:
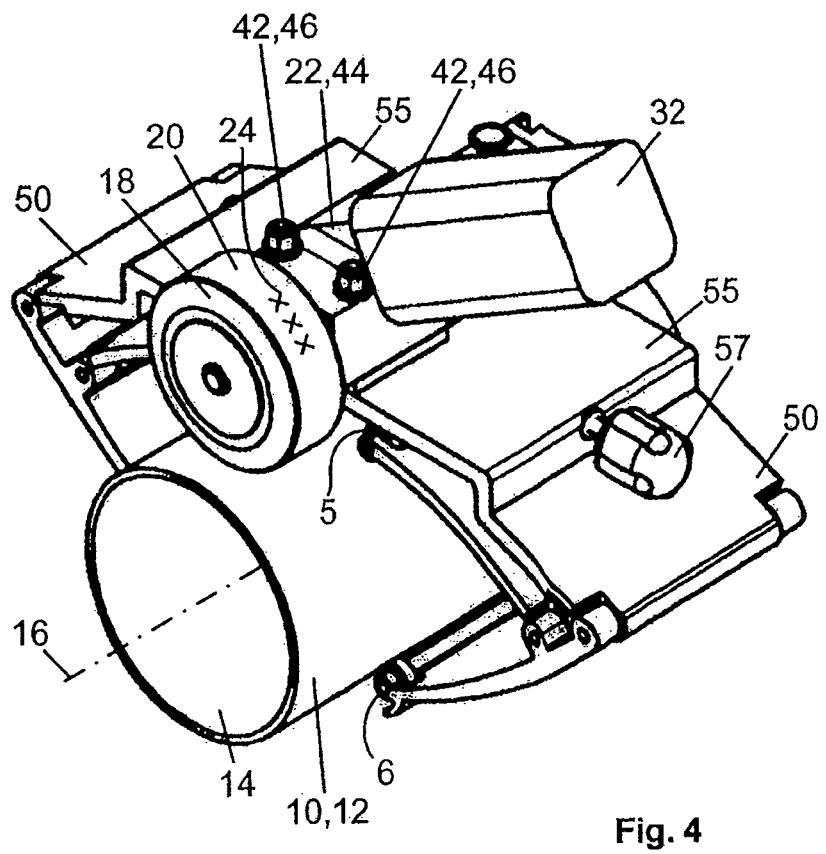
Figure 2:
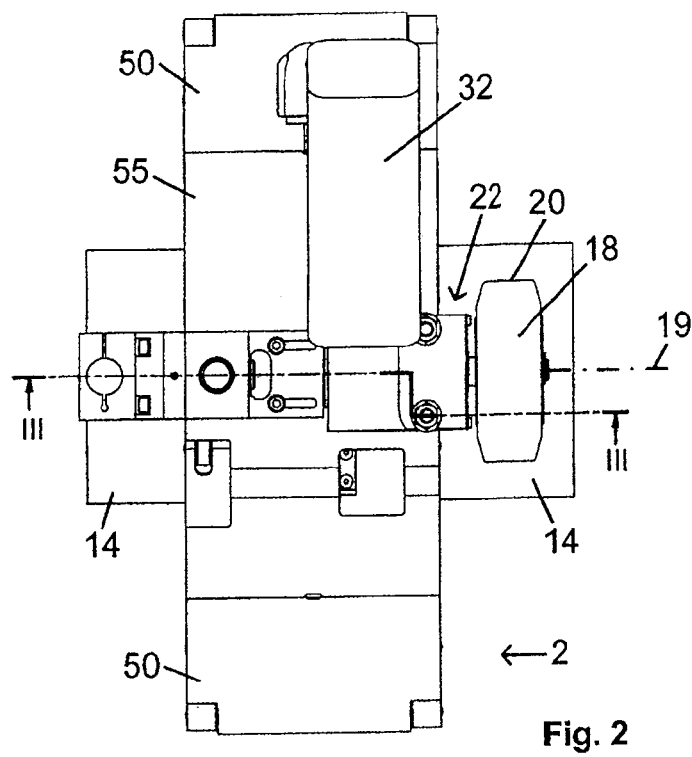
Figure 3:
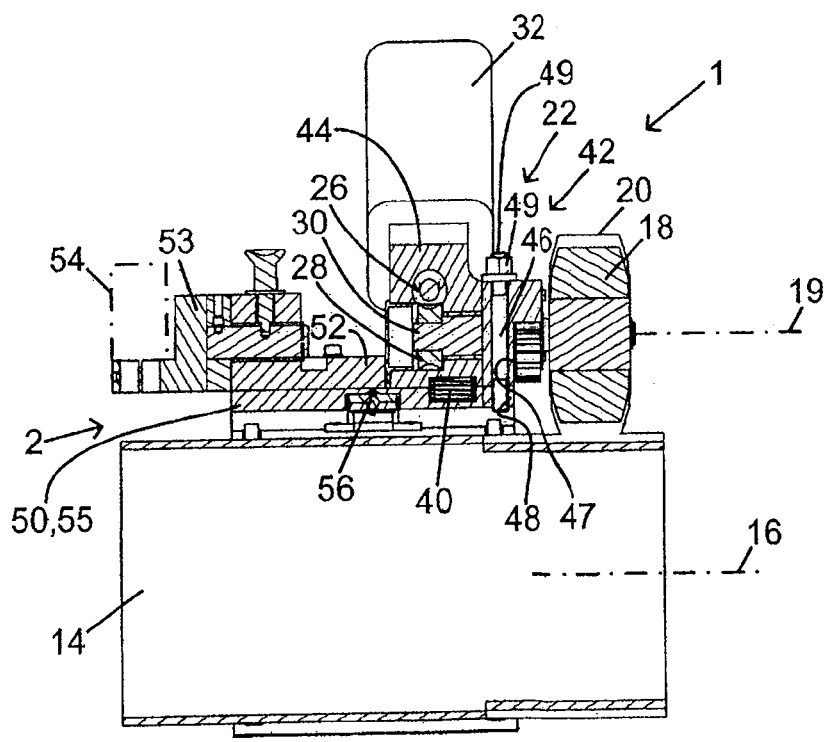
Figure 5:
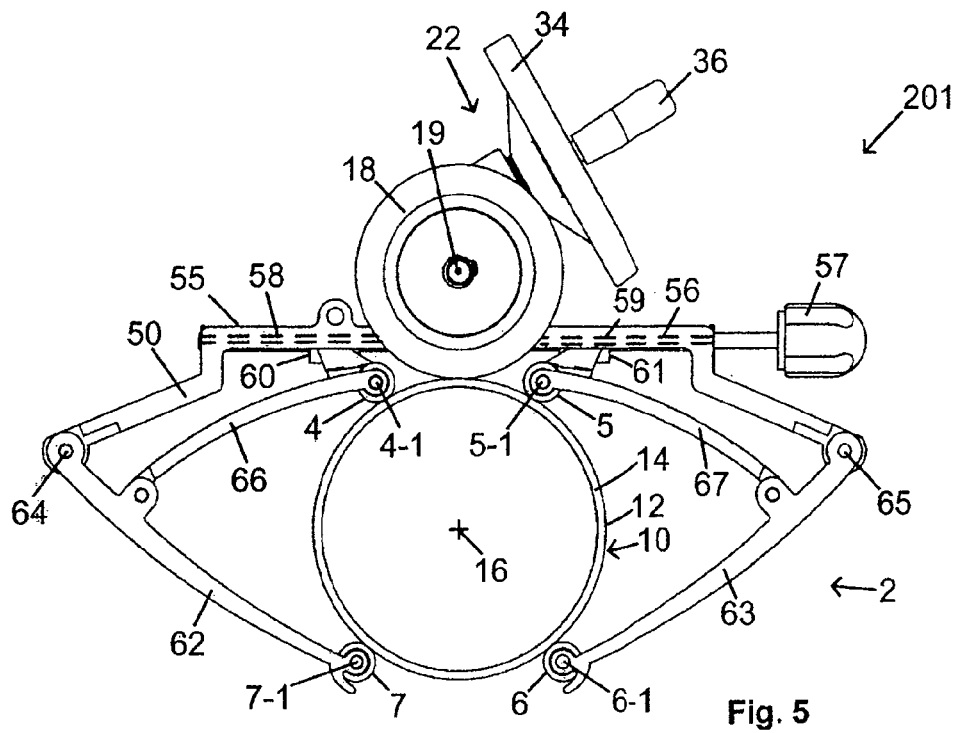
Figure 8:
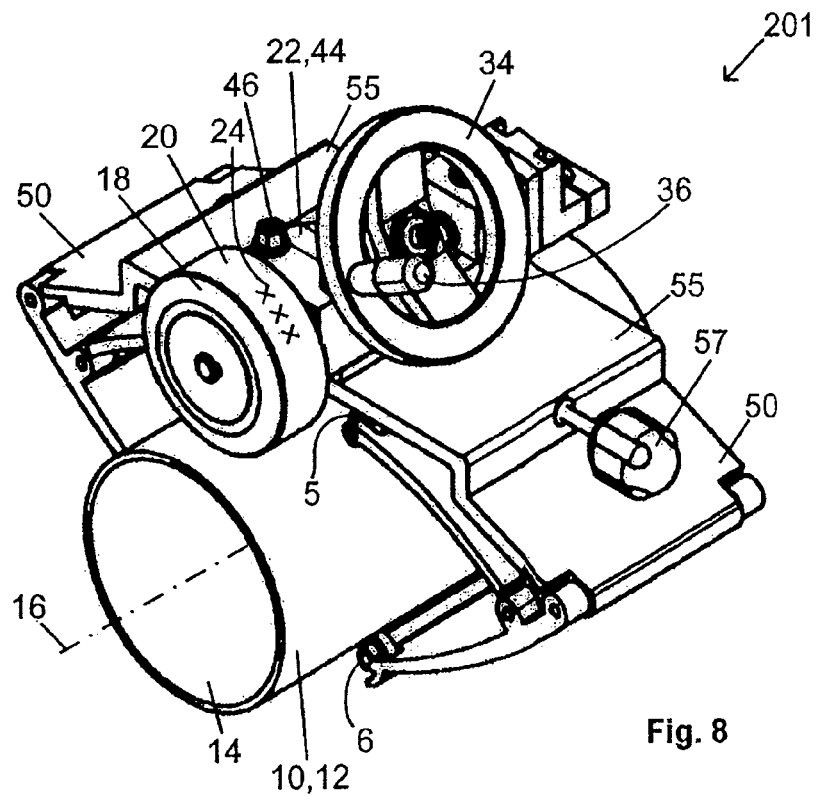
Figure 6:
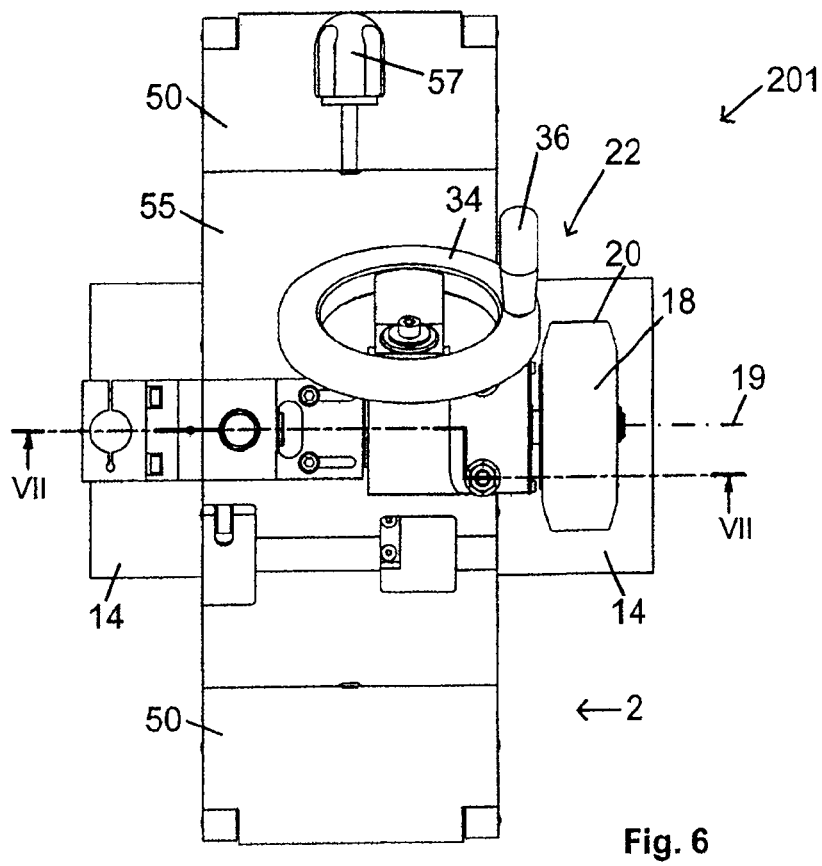
Figure 7:
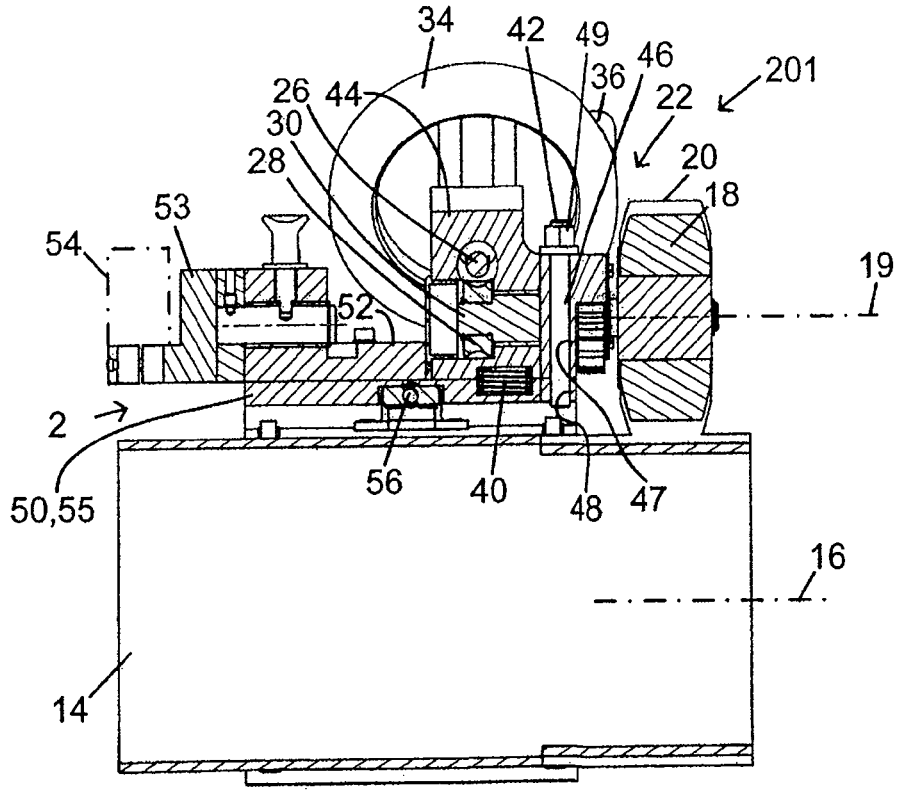
Figure 9:
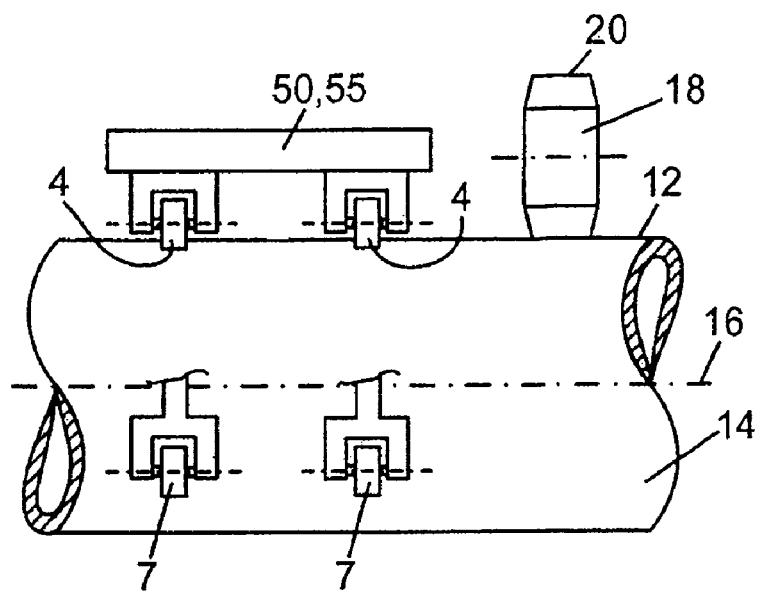
Figure 10:
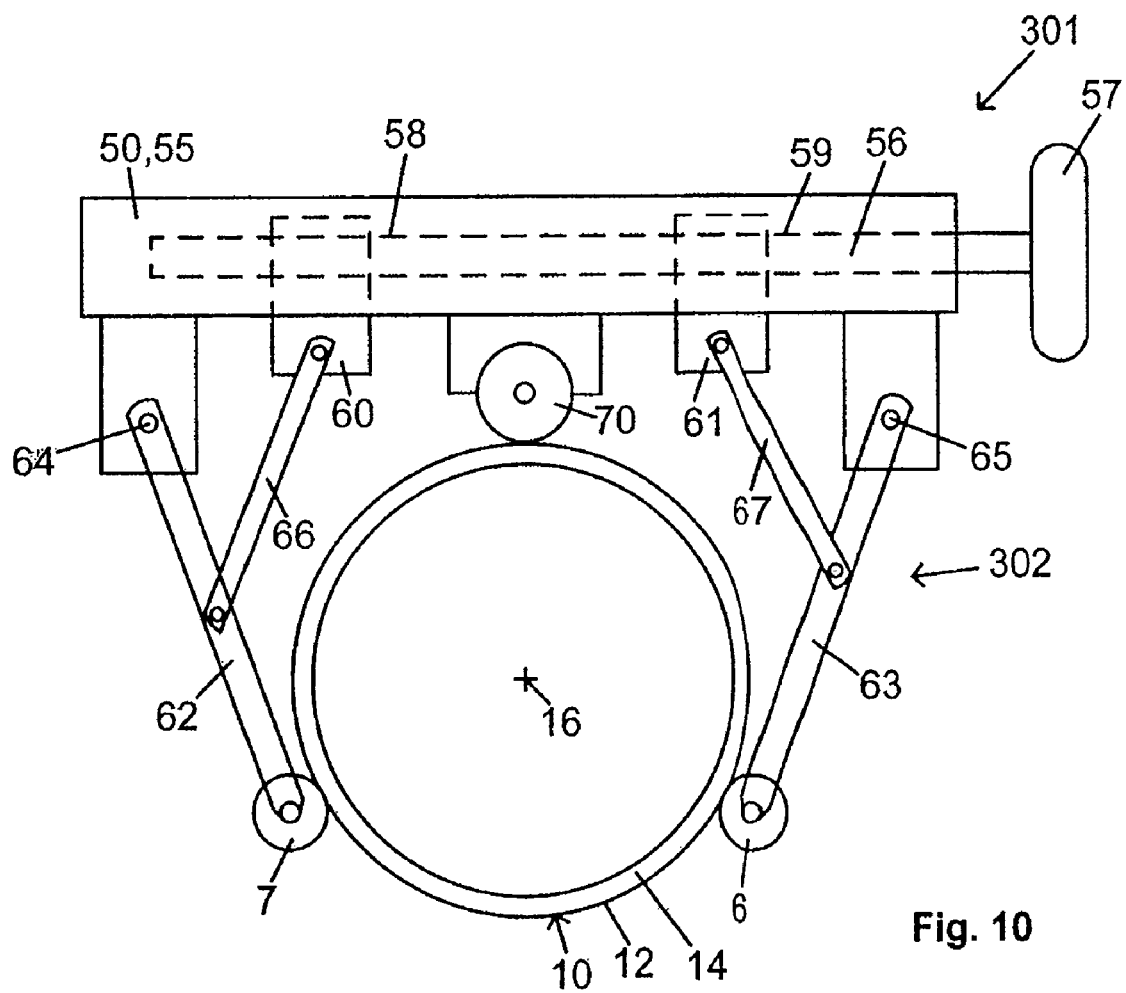

FIG. 1 is an end-face view of a pipe processing apparatus of the invention fitted with a motor, FIG. 2 is a topview of the pipe processing apparatus of FIG. 1, FIG. 3 is a stepped longitudinal section along the plane III-III of FIG. 2, FIG. 4 is a perspective view of the pipe processing apparatus of FIGS. 1 through 3, FIG. 5 is an end-face view of another embodiment mode of a pipe processing apparatus of the present invention fitted with an embodiment mode being identical with that of FIGS. 1 through 4 except that the said motor of the first embodiment mode was replaced by the manual drive, FIG. 6 is a topview of the pipe processing apparatus of FIG. 5, FIG. 7 is a stepped, longitudinal section along the plane VII-VII of FIG. 6, FIG. 8 is a perspective view of the pipe processing apparatus of FIGS. 5 through 7, FIG. 9 schematically shows a side view of components of the pipe processing apparatus of FIGS. 1 through 8 devoid both of motor and manual drive, FIG. 10 is a side view of components of a further embodiment mode of a gripping mechanism for the pipe processing apparatus of FIGS. 1 through 8, and FIG. 11 is an end face view of a further embodiment mode of the present invention as seen in a direction opposite to that applying to FIGS. 1 through 8.

Preferably the pipe processing apparatus 1 shown in FIGS. 1 through 4 shall be manually operated. It contains a gripping mechanism 2 fitted with at least three bracing rollers 4, 5, 6 and/or 7 of which at least three are configurable/configured in distributed manner on a circle 10 corresponding to the outside diameter of a pipe 14 to be/being processed. The axes of rotation 4-1, 5-1, 6-1 and 7-1 of the bracing rollers 4 through 7 are mutually parallel and parallel to the central longitudinal axis 16 of the pipe 14, as a result of which the gripping mechanism 2 is able to enclosed by its bracing rollers 4 through 7 the pipe 14 and to center it radially, whereupon the enclosed and centered pipe 14 held in said gripping mechanism can be rotated on the said bracing rollers 4 through about the pipe's longitudinal axis of rotation 16, or the pipe processing apparatus 1 is rotatable about the pipe 14 enclosed and centered by said gripping mechanism.

In the present invention, the pipe processing apparatus 1 is fitted with at least one drive wheel 18 which is supported at said apparatus to be rotated axially parallel to the bracing rollers 4 through 7 about a wheel axis of rotation 19 and which is positioned/positionable—by its moving circumferentially outer surface in the form of a tread 20—on or radially inside the circle 10 at a site where said tread 20 can make contact with the pipe 14 held by the bracing rollers 4 through 7 and is able to rotate said pipe by static friction.

Moreover the processing apparatus 1 of the present invention is fitted with a drive system 22 operationally connected/connectable to the drive wheel 18 for instance by a coupling or a free wheel to actuate the drive wheel 18. The configuration is such that the drive wheel 18 powered by the drive system 22 is able to rotate the pipe 14—which is centered and enclosed by the gripping mechanism 2—relative to the processing apparatus 1 or that it can rotate the pipe processing apparatus 1 about the pipe enclosed and centered by the gripping mechanism 2, in each instance said drive wheel rolling in the circumferential direction along the outer pipe circumference 12.

Preferably the tread 20 of the drive wheel 18 is made of an anti-slip material such as rubber or plastic.

The tread 20 of the drive wheel 18 may be smooth or rough or be cross-sectionally contoured (24) in order to improve its anti-slip property on the outer surface 12 of the pipe 14. The pipe 14 may be a metal or plastic.

The tread 20 of the drive wheel 18 may be elastically compressible to allow being compressed by the pressure exerted by the drive wheel on the pipe. This feature allows improving the static friction between the drive wheel 18 and the pipe 14. This compressibility of the drive wheel 18, at the least of its tread 20, furthermore it is a reason the drive wheel 18 may be advantageously positioned not only as far as the circle 10, but also beyond within it, as a result of which its tread 20 can be compressed elastically by the pipe 14.

Independently of the above, advantageously the drive wheel 18 not only may be positionable radially inward as far as or farther inward than the circle 10, but also radially outward outside said circle, illustratively to facilitate mounting and removing by means of the gripper mechanism 2 the pipe processing apparatus 1 onto respectively from said pipe.

Instead of one drive wheel 18, two or more drive wheels 18 also may be used, either as twin wheels and/or spaced apart in the wheel axial directions and/or in the circumferential direction.

The drive system 22 may be a torque transmitting system in the form of a chain drive, toothed belt drive V belt drive or a friction roller drive or preferably a gearing drive.

In the preferred embodiment mode of the present invention, the torque transmitting system of the drive system 22 is a gearing, preferably a reduction gearing to convert a high angular speed at a gearing input 26 into a comparatively lower angular speed at a gearing output 28, the latter being operationally connected to the drive wheel 18.

In a preferred embodiment of FIGS. 1 through 4, the gearing input 26 is a worm shaft 26 and the gearing output 28 is a worm wheel 28, both meshing each other. The worm wheel 28 constituting the gearing output 28 is connected/connectable by a shaft 30 configured axially to it directly to the drive wheel 18 or by means of a further gearing stage. The worm wheel 28 constituting the gearing output is connectable/connected either directly by a shaft 30 axial thereto with the drive wheel 18, or by means of an additional gearing stage.

Preferably the drive system 22 is designed in a manner to allow connecting a drive element to the gearing input. Preferably the gearing input 26—preferably in the form of a worm shaft—is fitted for instance with a coupling in a manner that alternatively a motor drive, for instance an electric motor 32 corresponding to the FIGS. 1 through 4, or a manual drive, illustratively a handwheel 34 corresponding to the FIG. 5 through 8, can be connected to the gearing input 26. The handwheel 34 may be fitted with a grip 36.

The pipe processing apparatus 1 of FIGS. 1 through 4 differs from the pipe processing apparatus 201 of FIG. 5 through 8 only in that the former is fitted with a motor 32 and the latter uses a hand drive 34. Accordingly the components already described in relation to FIGS. 1 through 4 are not discussed in detail again in relation to FIGS. 5 through 8.

In each pipe processing apparatus 1 and 201 of FIGS. 1 through 8, the drive wheel 18 may be stationary in such a position that it shall be tightened against the external circumferential surface 12 of the pipe 14 by the gripping mechanism 2 only when same seizes a pipe 14. Instead or preferably additionally as regards these pipe processing apparatus 1 and 201, the drive wheel 18 may be configured relative to the gripping mechanism 2 transversely to the axes of rotation 4-1 through 7-1 of the bracing rollers 4 through 7 and thereby transversely to the circle 10 in height adjustable manner. A special embodiment mode of such a design is shown identically both in FIGS. 1 through 4 and FIGS. 5 through 8.

In the preferred embodiment of the present invention, the drive wheel 18 and the drive system 22. are combined into a drive unit 18/22 which is configured relatively to the circle 10 defined by the bracing rollers 4 through 7 transversely to the axes of rotation 4-1 through 7-1 and hence also relatively to the gripping mechanism 2 and the pipe 14 in height-adjustable manner.

The height-adjustability of the drive unit 18/22 relative to the gripping mechanism 2 may be implemented in various ways, for instance by adjustable cams, by using spacers such as shims, adjusting screws and similar mechanical means.

A preferred embodiment of the present invention shown in FIGS. 1 through 8 comprises at least one compression spring 40, preferably at least two compression springs 40 configured next to each other but apart, which force(s) outward the drive unit 18/22 in the direction of the circle 10 defined by the gripping mechanism 2 and hence by the bracing rollers 4 through 7. Said embodiment further comprises a positioning device 42 allowing adjusting the drive unit 18/22 against the force of the minimum of one compression spring 40 toward the circle 10. The force exerted by the minimum of one compression spring 40 is applied transversely to the axis of rotation 19 of the drive wheel 18. Preferably said minimum of one compression spring 40 is a mechanical spring though it also may be a pneumatic one.

In the preferred embodiment mode of the present invention shown in FIGS. 1 through 8, the drive system 22 comprises a gearing casing 44 wherein are rotatably supported the worm shaft 26 constituting the gearing input 26, the shaft 30 with the worm wheel 28 constituting the gearing output 28, and the drive wheel 18.

Preferably the minimum of one compression spring 40 shall be configured between the gearing casing 44 and the gripping mechanism 2. The adjustment device 42 contains at least one or several, preferably two threaded bolts 46 by means of which the gearing casing 44 while overcoming the force exerted by the minimum of one compression spring 40 is screwed onto the gripping mechanism 2. Each threaded bolt 46 runs transversely to the longitudinal direction of the drive wheel's axis of rotation 19 through a borehole 47 in the gearing casing 44 and is screwed into a threaded borehole 48 of the gripping mechanism 2. A bolt head 49 or a nut screwed onto the minimum of one threaded bolt 46 can be tightened against an external surface of the gearing casing 44.

Preferably the gripping mechanism 2 is fitted with a base element or base body 50. Both the drive system 22 and a tool head 52 can be affixed to said base element as illustratively indicated in FIGS. 1 through 8. In an alternative embodiment mode (omitted), a further base element might be affixed to the base element 50 of the gripping mechanism 2, the drive system 22 and the tool head 52 being mounted on this additional base element. Preferably the base element 50 is a cross-sectionally contoured or tread-patterned plate. The threaded boreholes 48 to hold the threaded bolts 46 may be fitted into the base element 50.

The tool head 52 constitutes one structural unit and the drive system 22 together with the drive wheel 18 constitutes another, both structural units being affixable independently from each other to the gripper mechanism 2. Illustratively such a configuration allows using different tool heads 52 depending on the tools needed.

The tool head 52 may be of arbitrary form to affix an arbitrary tool or an arbitrary tool holder or an arbitrary pipe processing element. Illustratively and as shown in FIGS. 3 and 7, a tool holder 53 to hold a tool 54 can be mounted on the tool head 52, for instance to hold a plasma burner indicated by dashed lines in FIG. 3, used for instance to cut pipes by plasma cutting. Also a laser might be used for pipe processing, or gas burners, or a pipe cutter using a circular saw blade. The tool or a pipe processing element alternatively may be affixed directly, that is without the intermediary of a tool head 52, on the base element 50. Moreover the tool or the pipe processing element may be an electric arc welder, for instance in an metal/inert-gas procedure (MIG), a metal/active procedure (MAG) or a tungsten/inert-gas procedure (TIG).

The gripping mechanism 2 must comprise at least three bracing rollers 4, 5, 6 and/or 7 circumferentially distributed on a pipe 14. To reliably preclude the pipe processing apparatus 1 respectively 201 from tilting transversely to the pipe's longitudinal axis, either the minimum of at least three bracing rollers 4 through 7 must be each long enough in the pipe's longitudinal direction, or they must be mutually spaced apart in that longitudinal direction. In the embodiments shown in FIGS. 1 through 8, there are two sets each with four rollers 4 through 7 configured axially apart.

The gripping mechanism 2 may be designed in a number of ways. In one preferred embodiment mode, a threaded spindle 56 is rotatably supported in a planar segment 55 of the base element 50 and is fitted with a grip 57 to rotate said spindle. The threaded spindle 56 comprises two threaded segments 58 and 59 of which one is a right-handed and the other a left-handed thread. The threaded segment 58 engages a threaded muff 60. The other thread segment 59 engages a threaded muff 61. The two end sections of the base element 50 running in opposite directions transversely to the axis of rotation 19 of the drive wheel 18 and therefore transversely to the pipe's longitudinal axis 16 are connected to a gripper arm 62 respectively 63 of the gripping mechanism 2 by means of an articulating link 64 respectively 65. One gripper arm 62 is connected in articulating manner by a cross-arm 66 to the threaded muff 60. The other gripper arm 63 is connected in articulating manner by a further cross-arm 67 to the other threaded muff 61. The bracing rollers 7 and 6 are respectively rotatably supported on the free ends of the gripping arms 62 and 63. The bracing rollers 4 and 5 are respectively rotatably supported at the ends of the cross-arms 66 and 67 adjacent to the threaded muffs 60 and 61. Upon rotation of the threaded spindle 56, the gripper arms 62 and 63 are displaced by the cross arms 66 and 67 onto different diameters of the circle 10, the bracing rollers 4,5, 6 and 7 defining the circle 10 and its center which is situated in the pipe longitudinal axis 16.

The cutaway side view of FIG. 9 shows only the two lower bracing rollers 7 and the two upper bracing rollers 4.

FIG. 10 is an end face view of components of a further embodiment mode of a pipe processing apparatus 301 of the present invention which differs from the previously discussed embodiment modes only in that the gripping mechanism 302 replaces the gripping mechanism 2, in this instance there being bracing rollers configured around the pipe at three sites, namely the already discussed bracing rollers 6 and 7 and, in lieu of the above discussed bracing rollers 4 and 5, one bracing roller 70. The bracing roller 70 is rotatably supported at the planar segment 55 of the base element 50. In the embodiment mode shown in FIG. 10, the cross-arms 66 and 67 are devoid of bracing rollers.

Figure 11:
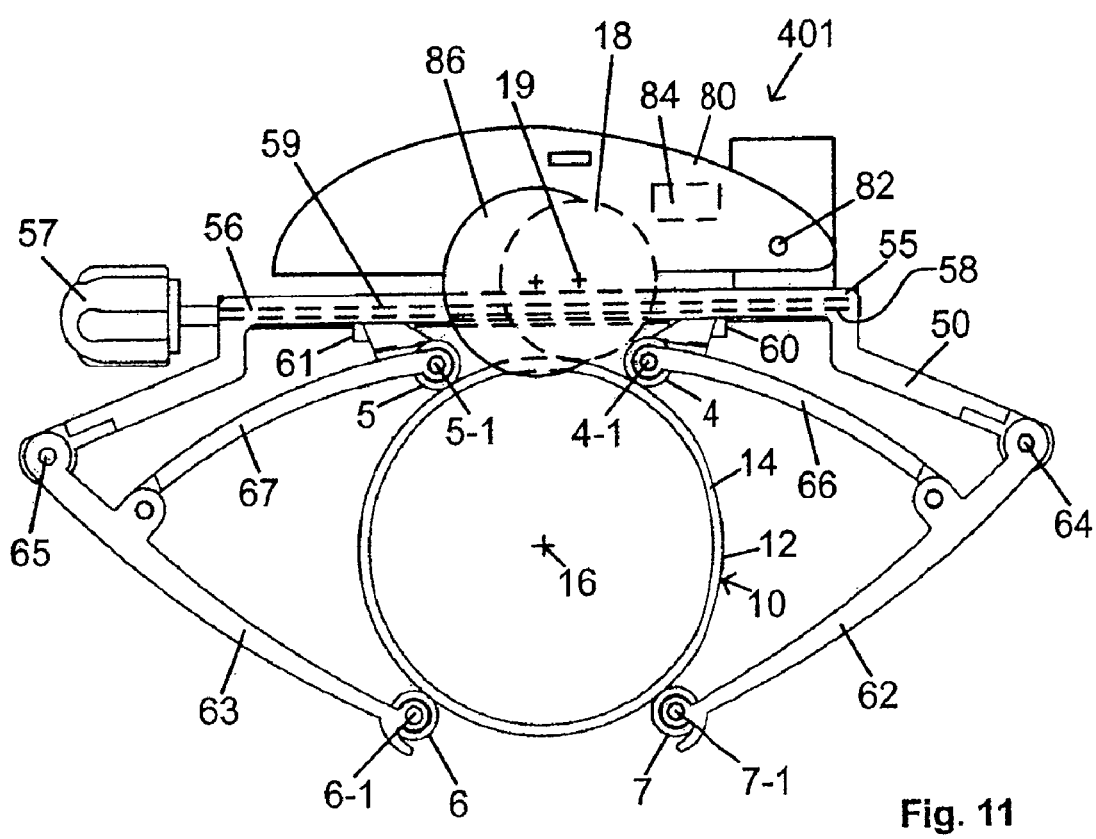

The further embodiment mode of the present invention of a pipe processing apparatus 401 schematically shown in FIG. 11 in an end face view is fitted with a pipe processing element 80 pivotably affixed at the base element 55 of the gripping mechanism 2 about an axis of rotation 82 running parallel to the axis of rotation 19 of the drive wheel 18. Said pipe processing element 80 contains a motor, preferably an electric motor 84, driving a tool 86, also rotatably supported in the pipe processing element 80, in the form of a circular saw blade or a cutting grinding, disk, for instance a diamond grinding disk, to cut a pipe 14. According to FIG. 11, the pipe processing element 80 may be affixed directly, namely without resort to a tool head 52, to the gripping mechanism 2, or, in another embodiment mode, to said tool head 52.

The invention claimed is:

1. A pipe processing apparatus, comprising:
   a gripping mechanism fitted with a plurality of bracing rollers which are positioned spaced apart along a circle corresponding to the outer diameter of a pipe to be processed,
   each of said plurality of bracing rollers having an axis of rotation running parallel to each other and parallel to the longitudinal axis of the pipe, wherein said plurality of bracing rollers is able to grip in enclosing manner the pipe and to radially center it, wherein the circularly gripped and centered pipe within the gripping mechanism and the plurality of bracing rollers are rotatable relative to one another about the pipe longitudinal axis,
   wherein a drive wheel which is rotatably supported to be axially parallel to the plurality of bracing rollers on the pipe processing apparatus wherein the outer circumference of the drive wheel comprises a tread and is positioned at a site where the tread can contact the pipe held by the bracing rollers and drive it by static friction; and
   a drive system which is operationally linked with the drive wheel to power the drive wheel which thereby is enabled to rotate the circularly gripped and centered pipe relative to the pipe processing apparatus, or whereby the drive wheel is enabled to rotate the pipe processing apparatus about the circularly gripped and centered pipe, in the process the drive wheel rolling on and along the outer circumference of the pipe, and
   wherein the drive system and the drive wheel are combined into one drive unit which is configured in height-adjustable manner relative to the circle defined by the plurality of bracing rollers and transversely to the axes of rotation of the plurality of bracing rollers, the gripping mechanism, and the pipe.

2. A pipe processing apparatus as claimed in claim 1, wherein the tread of the drive wheel is fitted with an anti-slip material.

3. A pipe processing apparatus as claimed in claim 1, wherein the tread of the drive wheel is elastically compressible, thereby the tread can be compressed by the pressure applied by the drive wheel against the pipe.

4. A pipe processing apparatus as claimed in claim 1, wherein the tread of the drive wheel is cross-sectionally contoured to enhance the anti-slip properties of said tread.

5. A pipe processing apparatus as claimed in claim 1, wherein the drive system is fitted with a gearing to convert a large angular speed at a gearing input into a lower angular speed at a gearing output, said gearing output being operationally linked to the drive wheel.

6. A pipe processing apparatus as claimed in claim 1, wherein the drive wheel is configured in height-adjustable manner relative to the circle defined by the bracing rollers and transversely to the axes of rotation of said bracing rollers.

7. A pipe processing apparatus as claimed in claim 1, wherein the drive system is fitted with a handwheel to power the drive wheel.

8. A pipe processing apparatus as claimed in claim 1, wherein the drive system is fitted with a motor for powering the drive wheel.

9. A pipe processing apparatus as claimed in claim 1, wherein the drive system is designed to be alternatively connected with a handwheel.

10. A pipe processing apparatus as claimed in claim 1, further comprising a tool head or a pipe processing element.

11. A pipe processing apparatus as claimed in claim 1, wherein the tool head or the pipe processing element is one structural unit, wherein the drive system together with the drive wheel is a second structural unit, wherein the structural units can each be mounted independently of the other on the gripping mechanism.

12. A pipe processing apparatus as claimed in claim 1, further comprising a mechanical or thermal pipe processing element or pipe processing tool used for pipe processing.

13. A pipe processing apparatus as claimed in claim 2, wherein the anti-slip material is rubber or plastic.

14. A pipe processing apparatus as claimed in claim 5, wherein the drive system gearing is a reducing gearing.

15. A pipe processing apparatus, comprising:
- a gripping mechanism fitted with a plurality of bracing rollers which are positioned spaced apart along a circle corresponding to the outer diameter of a pipe to be processed,
- each of said plurality of bracing rollers having an axis of rotation running parallel to each other and parallel to the longitudinal axis of the pipe, wherein said plurality of bracing rollers is able to grip in enclosing manner the pipe and to radially center it, wherein the circularly gripped and centered pipe within the gripping mechanism and the plurality of bracing rollers are rotatable relative to one another about the pipe longitudinal axis,
- wherein a drive wheel which is rotatably supported to be axially parallel to the plurality of bracing rollers on the pipe processing apparatus, wherein the outer circumference of the drive wheel comprises a tread and is positioned at a site where the tread can contact the pipe held by the bracing rollers and drive it by static friction; and
- a drive system which is operationally linked with the drive wheel to power the drive wheel which thereby is enabled to rotate the circularly gripped and centered pipe relative to the pipe processing apparatus, or whereby the drive wheel is enabled to rotate the pipe processing apparatus about the circularly gripped and centered pipe, in the process the drive wheel rolling on and along the outer circumference of the pipe,
- at least one compression spring which forces the drive unit away from the circle defined by the plurality of the bracing rollers, and
- a positioning device allowing adjusting the drive unit against the opposing force of the said spring toward the circle.

16. A pipe processing apparatus as a claimed in claim 8, wherein the motor is an electric motor.

17. A pipe processing apparatus as claimed in claim 12, wherein the mechanical or thermal pipe processing element is a laser processor or a plasma processor.

* * * * *